(12) United States Patent
Chiang

(10) Patent No.: US 7,746,582 B2
(45) Date of Patent: Jun. 29, 2010

(54) LENS MODULE

(75) Inventor: Tsung-Wei Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 66 days.

(21) Appl. No.: 12/251,390

(22) Filed: Oct. 14, 2008

(65) Prior Publication Data

US 2009/0225451 A1 Sep. 10, 2009

(30) Foreign Application Priority Data

Mar. 5, 2008 (CN) .......................... 2008 1 0300458

(51) Int. Cl.
*G02B 7/02* (2006.01)

(52) U.S. Cl. ........................................ 359/823; 359/819

(58) Field of Classification Search ......... 359/694–701, 359/819–824
See application file for complete search history.

(56) References Cited

U.S. PATENT DOCUMENTS 5,091,793 A * 2/1992 Goto et al. .................. 359/831

\* cited by examiner

*Primary Examiner*—Mohammed Hasan
(74) *Attorney, Agent, or Firm*—Clifford O. Chi

(57) ABSTRACT

A lens module includes a base, a rotating component, a positioning component and a lens barrel. The base includes at least one first positioning member and a hollow body which defines a receiving hole therein. An annular ledge is formed in the receiving hole. The rotating component includes an annular rotating barrel which is rotatably received in the receiving hole and contacts the ledge. An inner screw thread is formed on the inner wall of the rotating barrel. The positioning component defines a center hole therein and is positioned on the base and restricts the rotating barrel to contact the ledge. The lens barrel includes a main body passing through the center hole and at least one second positioning member engaging with the at least one first positioning member. An outer screw thread is formed on the main body and engages with the inner screw thread.

18 Claims, 7 Drawing Sheets

LENS MODULE

CROSS-REFERENCE STATEMENT

The present application is based on, and claims priority from, CN Application Serial Number 200810300458.3, filed on Mar. 5, 2008, titled "LENS MODULE", the disclosure of which is hereby incorporated by reference herein in its entirety.

BACKGROUND

1. Technical Field

The disclosed embodiments generally relates to imaging devices and, more particularly, to a lens module which has an accurate focusing function.

2. Description of Related Art

Currently, digital camera modules are included as a feature in a wide variety of electronic devices. A lens module is a critical component of the digital camera module. When digital camera modules are assembled, a focus distance of lenses may need to be adjusted via the lens modules to get clear images.

A typical lens module includes lenses, an image sensor, a lens barrel, and a stepping motor. The lens barrel encloses the lenses therein and is driven by the stepping motor to move with respect to the image sensor along the axis of the lenses, so that the image sensor can get clear images. However, the axis of the lens barrel is usually offset from the optical axis, which affects focusing of the lens module.

Therefore, a new lens module is desired to overcome the above-described shortcoming.

SUMMARY

An embodiment of a lens module includes a base, a rotating component, a positioning component, and a lens barrel. The base includes at least one first positioning member and a hollow body which defines a receiving hole therein. An annular ledge is formed in the receiving hole. The rotating component includes an annular rotating barrel which is rotatably received in the receiving hole and contacts the ledge. An inner screw thread is formed on the inner wall of the rotating barrel. The positioning component defines a center hole therein and is positioned on the base and restricts the rotating barrel to be in continuous contact with the ledge. The lens barrel includes a main body passing through the center hole and at least one second positioning member engaging with the at least one first positioning member. An outer screw thread is formed on the main body and threadedly engages with the inner screw thread.

Other advantages and novel features will become more apparent from the following detailed description when taken in conjunction with the accompanying drawings.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION OF THE EMBODIMENTS

Figure 1:
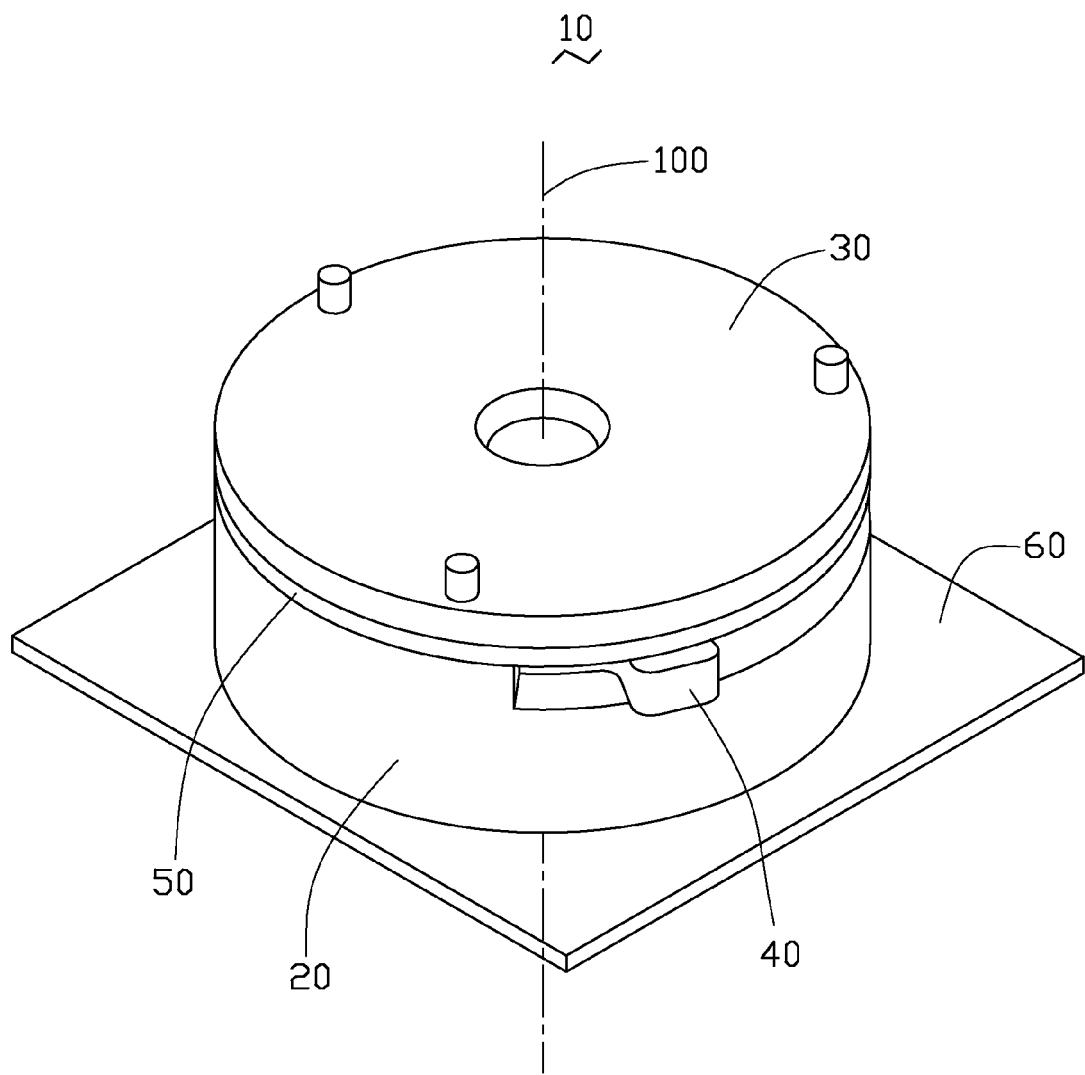
FIG. 1 is an assembled, perspective view of a first embodiment of a lens module.
Figure 2:
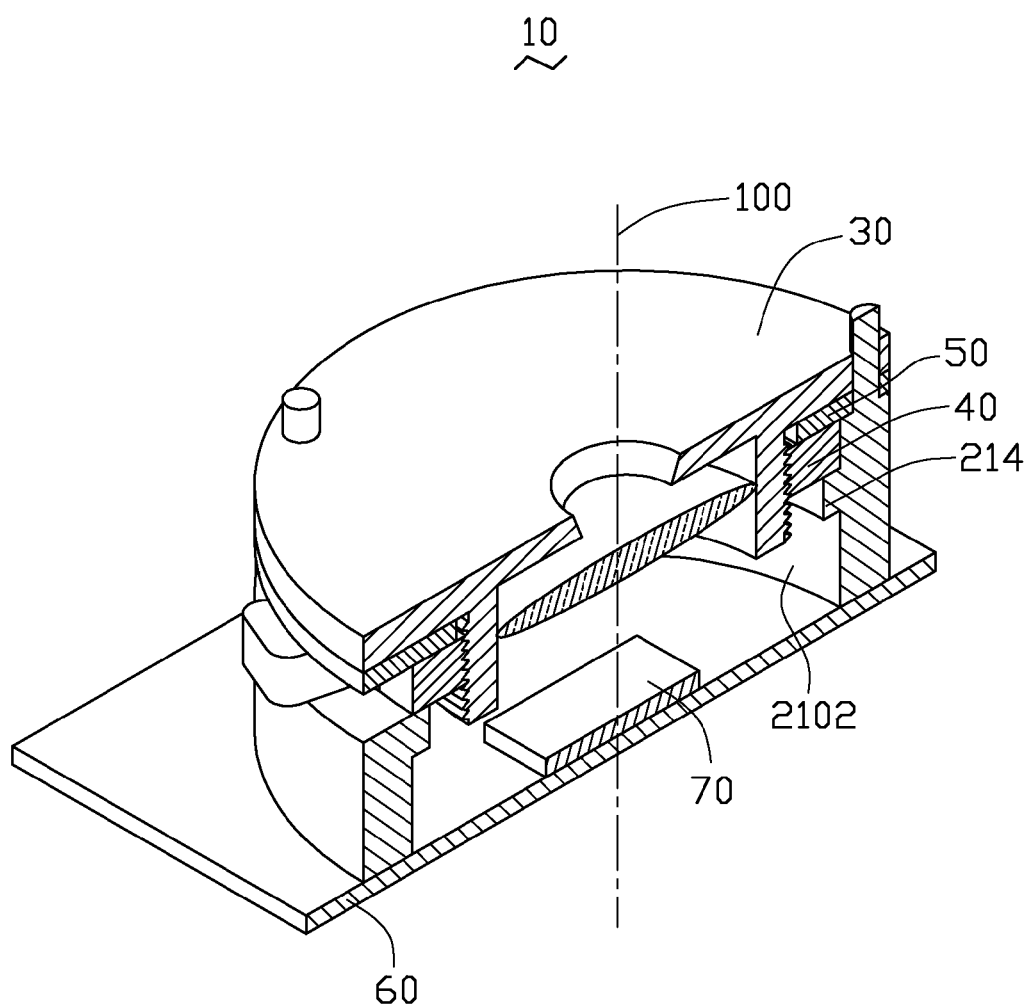
FIG. 2 is a cross-sectional view of the lens module of FIG. 1.
Figure 3:
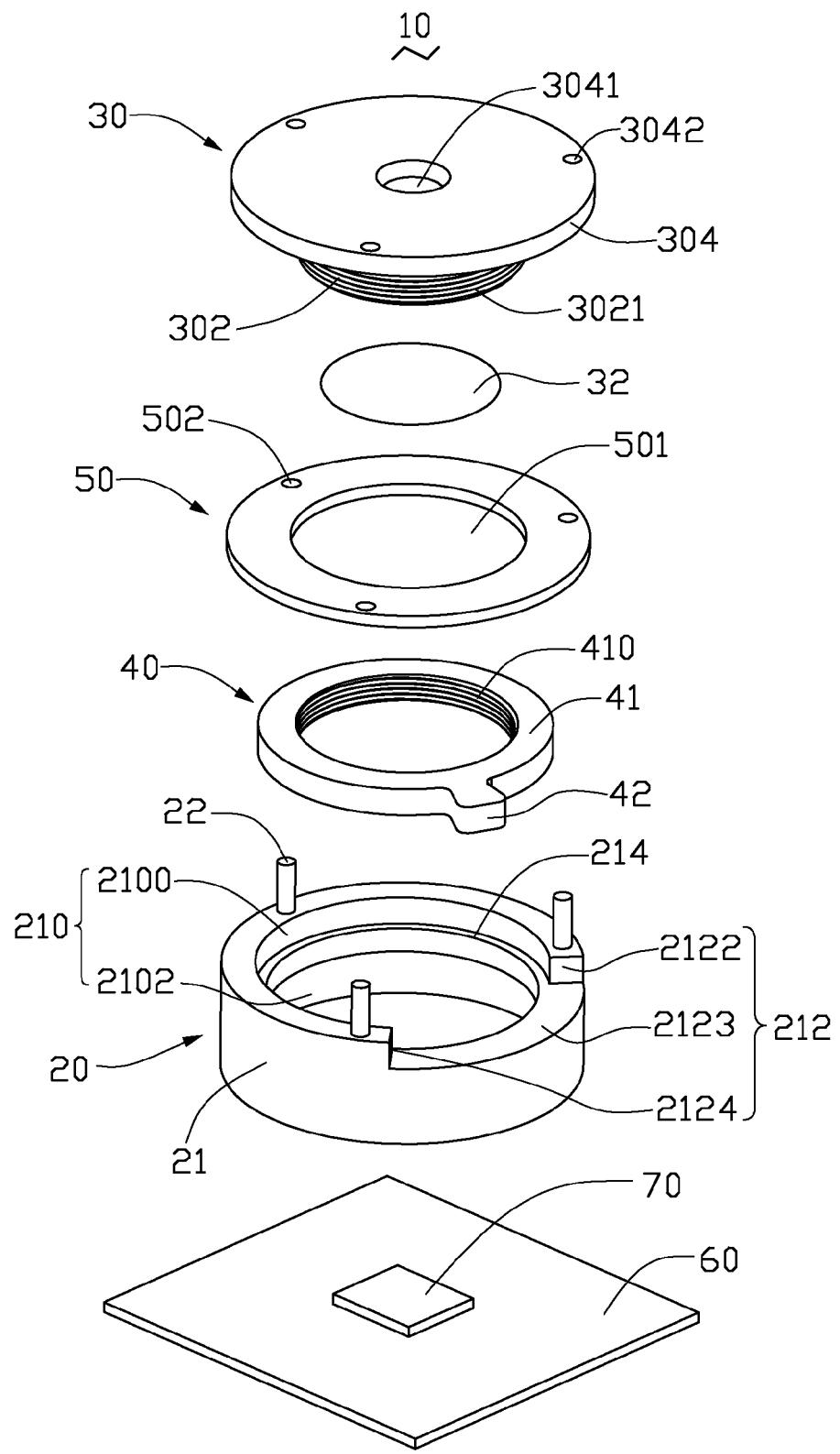
FIG. 3 is an exploded view of the lens module of FIG. 1.

Referring to FIGS. 1 through 3, a first embodiment of a lens module 10 includes a base 20, a lens barrel 30 with an axis 100, a rotating component 40, and a positioning component 50.

The base 20 includes a hollow cylindrical body 21 and at least one first positioning member 22. A receiving hole 210 is defined in a central portion of the cylindrical body 21. An annular ledge 214 is formed in the receiving hole 210 and is configured for supporting the rotating component 40. The annular ledge 214 divides the receiving hole 210 into a top portion 2100 configured for receiving the rotating component 40, and a bottom portion 2102 configured for receiving an image sensor 70 positioned on a circuit board 60. A handle cutout 212 is defined in a top portion of the cylindrical body 21. The handle cutout 212 has two sidewalls 2122, 2124, and a bottom wall 2123. In the embodiment of FIGS. 1 through 3, the bottom wall 2123 forms a portion of the ledge 24. In the embodiment of FIGS. 1 through 3, the base 20 includes three cylindrical-shaped first positioning members 22 evenly spaced on a top surface of the cylindrical body 21 extending along the axial direction of the base 20. In one embodiment, the first positioning member 22 may be integrally formed with the cylindrical body 21. In another embodiment, the first positioning member 22 may be fixed to the cylindrical body 21, for example, using an adhesive or by friction, such as by press-fitting.

The lens barrel 30 is configured for receiving at least one lens 32 and includes a main body 302 and a circular-shaped cap 304 positioned on an end of the main body 302. An outer screw thread 3021 is formed on the main body 302. An aperture 3041 is defined at a central portion of the cap 304 and at least one second positioning member 3042 corresponding to the first positioning member 22 is defined in the cap 304. The aperture 3041 is configured for allowing light to enter the lens module 10. In the embodiment of FIGS. 1 through 3, the second positioning member 3042 may be three positioning holes corresponding to the first positioning member 22.

The rotating component 40 includes an annular rotating barrel 41 and a handle 42 protruding outwardly from the rotating barrel 41. An inner screw thread 410 is formed on the inner wall of the rotating barrel 41 and configured for engaging with the outer screw thread 3021. The outer diameter of the rotating barrel 41 is larger than the inner diameter of the ledge 214 and is equal to or slightly smaller than the diameter of the top portion 2100. The thickness of the rotating barrel 41 in the axial direction is equal to or slightly larger than a height of the top portion 2100.

In the embodiment of FIGS. 1 through 3, the handle 42 may be integrally formed with the rotating barrel 41. In another embodiment, the handle 42 may be fixed to the rotating barrel 41.

The positioning component 50 may be an annular sheet and defines a center hole 501 and at least one through hole 502.

The diameter of the center hole 501 is slightly larger than the outer diameter of the main body 302. The through hole 502 corresponds to the first positioning member 22 and the second positioning member 3042.

The main body 302 with the lens 32 attached to the main body 302 is received in the center hole 501. The outer screw thread 3021 threadedly engages with the inner screw thread 410. The rotating barrel 41 is received in the top portion 2100 and contacts the ledge 214. The handle 42 is received in and can move freely in the handle cutout 212. The first positioning member 22 is received in the through hole 502 and the positioning hole 3042, thereby restricting the lens barrel 30 to move along the axis 100. The positioning component 50 is fixed to the base 20 and restricts the rotating barrel 41 in the top portion 2100 and prevents the rotating barrel 41 from moving along the axis 100.

The handle 42 drives the rotating barrel 41 to rotate in the top portion 2100 when the handle 42 is moved along the handle cutout 212. The inner screw thread 410 threadedly engages with the outer screw thread 3021 to drive the lens barrel 30 to move along the axis 100. The first positioning member 22 prevents the lens barrel 30 from rotating. Accurate focusing of the lens module 10 may be achieved according to a pitch of the inner screw thread 410 and the outer screw thread 3021.

It may be appreciated that the first positioning member 22 may be a positioning hole defined in the top surface of the body 21, and the second positioning member 3042 may be cylindrical shaped and extends from the cap 304 along the axis 100.

Figure 4:
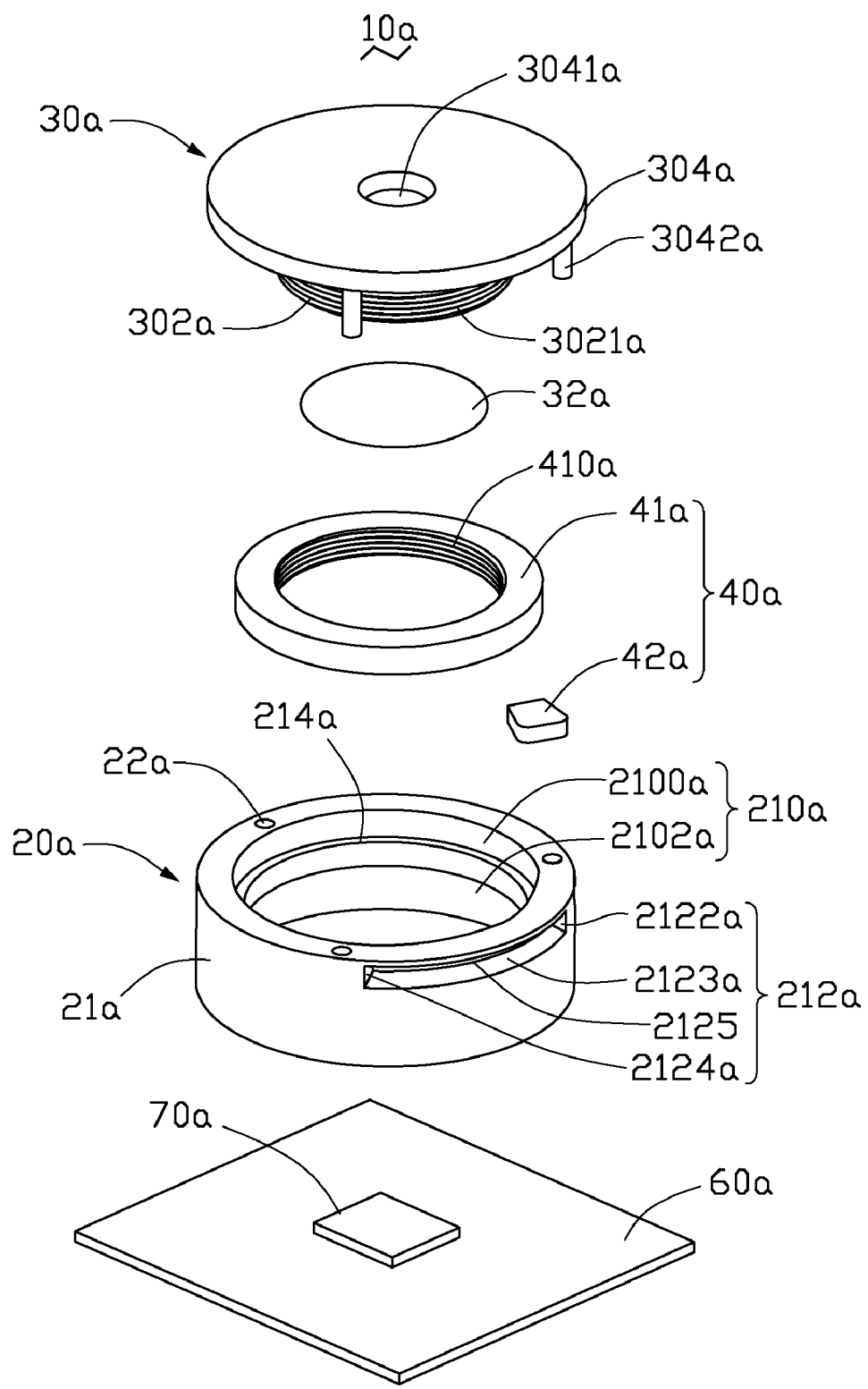
FIG. 4 is an exploded view of a second embodiment of a lens module.

Referring to FIG. 4, a second embodiment of a lens module 10a includes a base 20a, a lens barrel 30a, and a rotating component 40a.

The base 20a includes a hollow cylindrical body 21a and at least one first positioning member 22a. A receiving hole 210a is defined in a central portion of the cylindrical body 21a. An annular ledge 214a is formed in the receiving hole 210a and is configured for supporting the rotating component 40a. The annular ledge 214a divides the receiving hole 210a into a top portion 2100a configured for receiving the rotating component 40a, and a bottom portion 2102a configured for receiving an image sensor 70a positioned on a circuit board 60a. A rectangular opening 212a is defined in a top portion of the cylindrical body 21a. The opening 212a has a bottom wall 2123a, a top wall 2125 parallel to the bottom wall 2123a, and two sidewalls 2122a, 2124a. The bottom wall 2123a and the top wall 2125 are perpendicular to the axial direction of the base 20a. In the embodiment of FIG. 4, the base 20a includes three first positioning members 22a defined as three positioning holes evenly spaced on a top surface of the cylindrical body 21a.

The lens barrel 30a is configured for receiving at least one lens 32a and includes a main body 302a and a circular-shaped cap 304a positioned on an end of the main body 302a. An outer screw thread 3021a is formed on the main body 302a. An aperture 3041a is defined at a central portion of the cap 304a and is configured for allowing light to enter the lens module 10a. At least one second positioning member 3042a may be cylindrical-shaped and extends along the axial direction of the lens barrel 30a. The second positioning member is positioned on the cap 304a corresponding to the first positioning member 22a. In one embodiment, the second positioning member 3042a may be integrally formed with the lens barrel 30a. In another embodiment, the second positioning member 3042a may be fixed to the lens barrel 30a, for example, using an adhesive or by friction, such as by press-fitting.

The rotating component 40a includes an annular rotating barrel 41a and a handle 42a. An inner screw thread 410a is formed on the inner wall of the rotating barrel 41a and is configured for threadedly engaging with the outer screw thread 3021a. The outer diameter of the rotating barrel 41a is larger than the inner diameter of the ledge 214a and is equal to or slightly smaller than the diameter of the top portion 2100a. The handle 42a is independently formed with respect to the rotating barrel 41a and has a thickness in the axial direction of the rotating barrel 41a equal to a distance between the bottom wall 2123a and the top wall 2125.

The main body 302a with the lens 32a attached to the main body 302a is received in the rotating barrel 41a, and the outer screw thread 3021a threadedly engages with the inner screw thread 410a. The rotating barrel 41a is received in the top portion 2100a and contacts the ledge 214a. The second positioning member 3042a is received in the positioning holes 22a. The handle 42a is inserted into the opening 212a and is fixed on the exterior of the rotating barrel 41a.

The handle 42a drives the rotating barrel 41a to rotate in the top portion 2100a when the handle 42a is moved along the opening 212a. The inner screw thread 410a threadedly engages with the outer screw thread 3021a to drive the lens barrel 30a to move along the axial direction of the lens barrel 30a. The second positioning member 3042a prevents the lens barrel 30a from rotating. Accurate focusing function of the lens module 10a may be achieved according to a pitch of the inner screw thread 410a and the outer screw thread 3021a.

It may be appreciated that the first positioning member 22a may be cylindrical shaped and extends from the top surface of the body 21a along the axial direction, and the second positioning member may be a positioning hole defined in the cap 304a.

Figure 5:
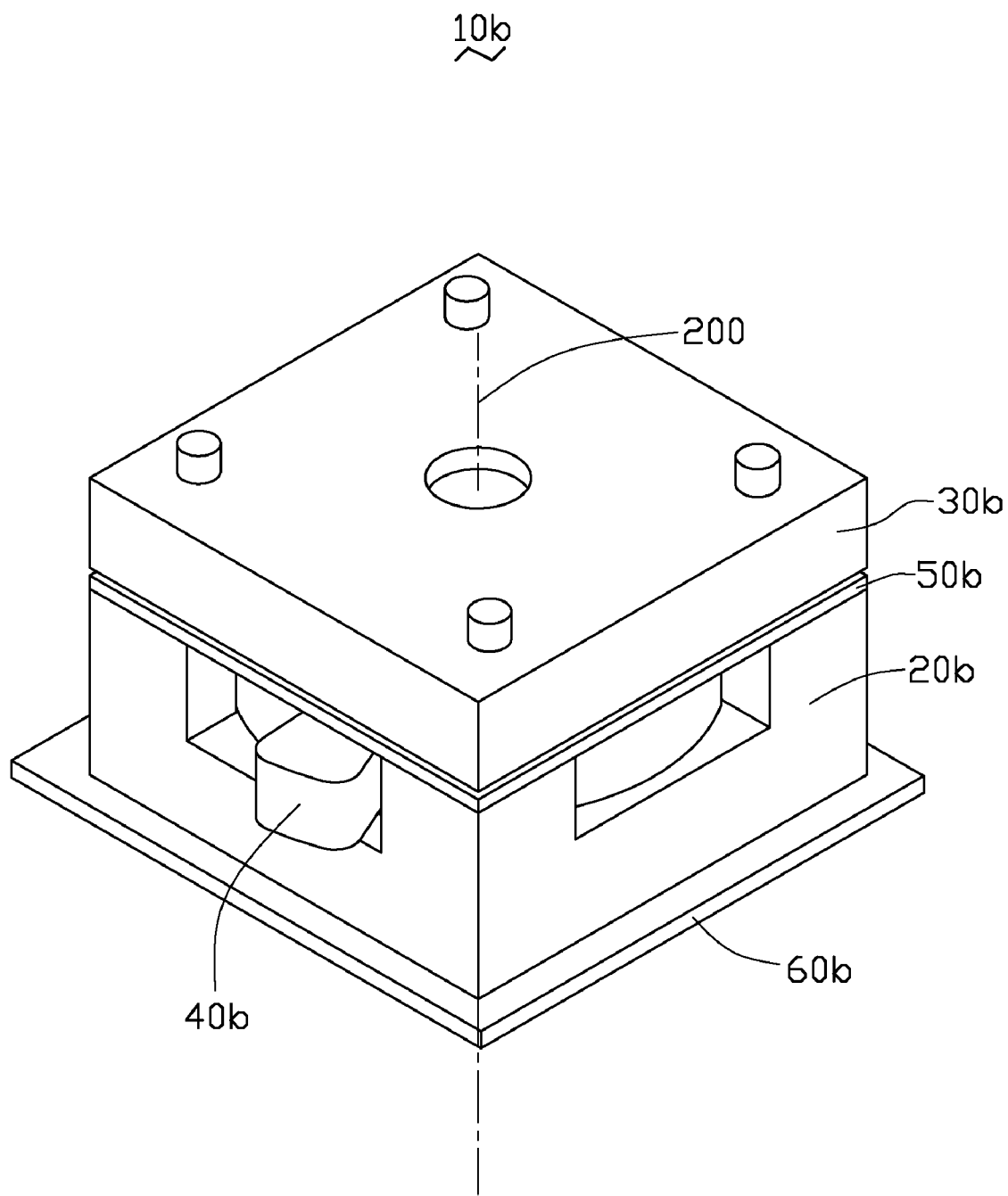
FIG. 5 is an assembled, perspective view of a third embodiment of a lens module.
Figure 6:
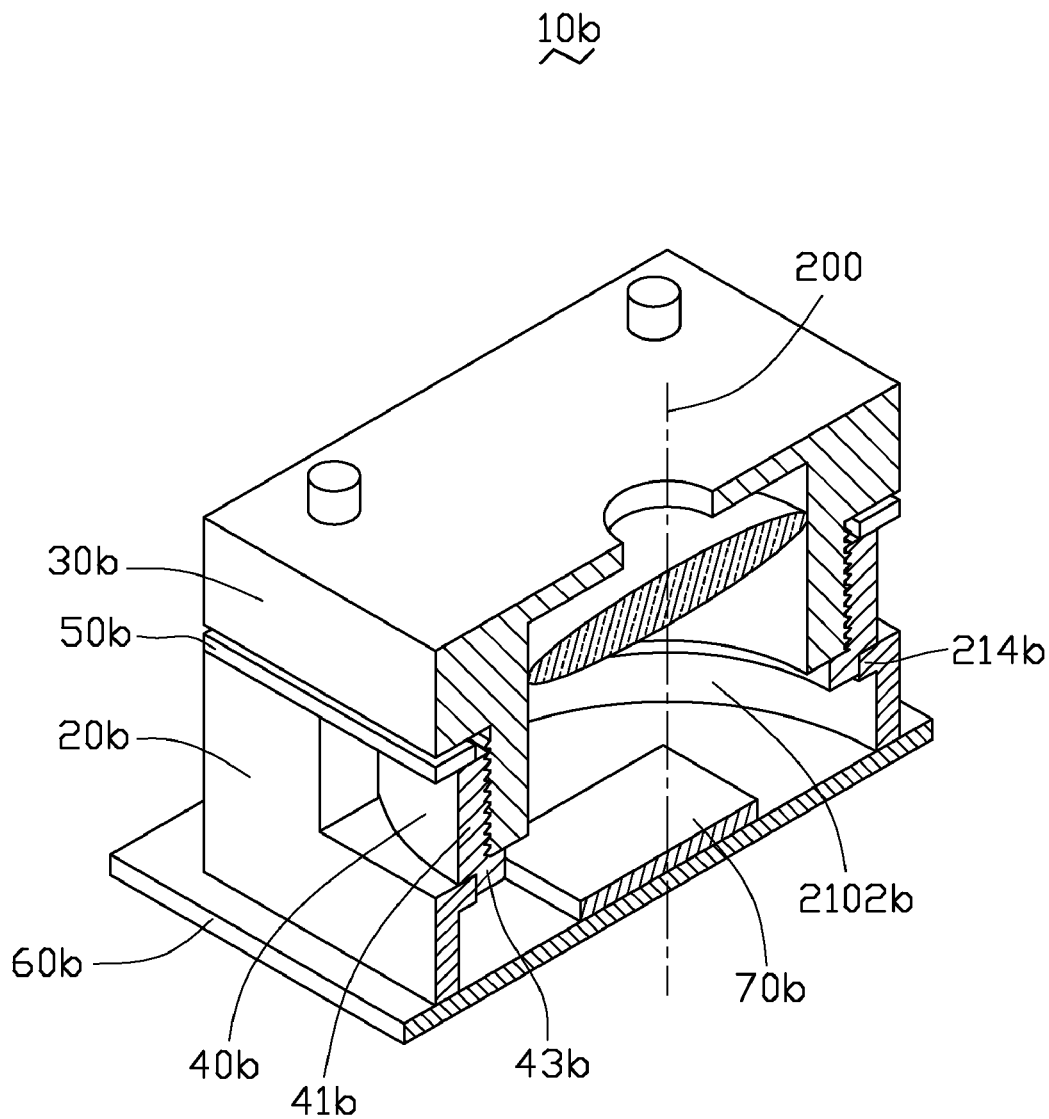
FIG. 6 is a cross-sectional view of the lens module of FIG. 5.
Figure 7:
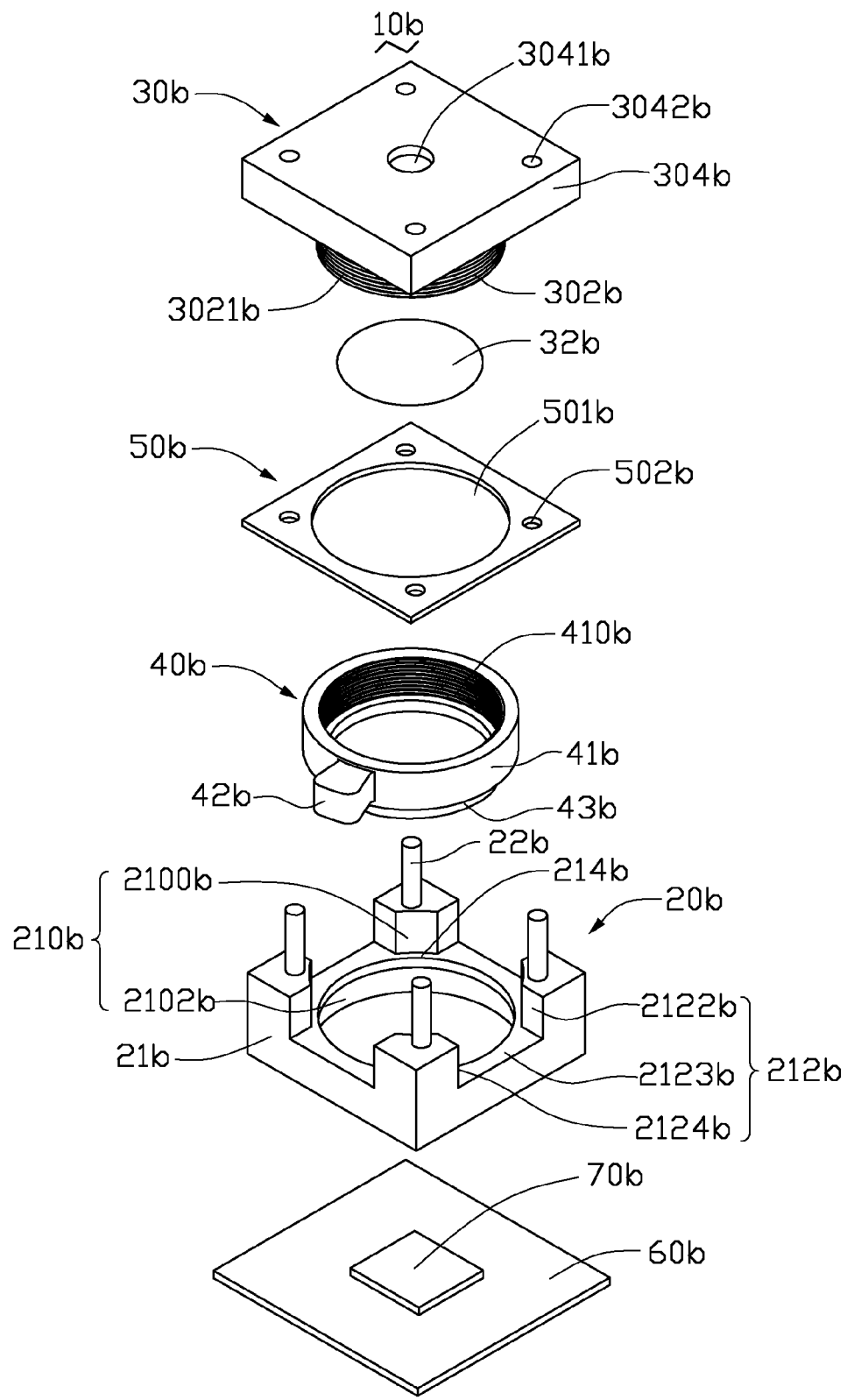
FIG. 7 is an exploded view of the lens module of FIG. 5.

Referring to FIGS. 5 through 7, a third embodiment of a lens module 10b includes a base 20b, a lens barrel 30b with an axis 200, a rotating component 40b, and a positioning component 50b.

The base 20b includes a hollow body 21b and at least one first positioning member 22b. A receiving hole 210b is defined in a central portion of the hollow body 21b. In the embodiment of FIGS. 5 through 7, the hollow body 21b is square shaped. The receiving hole 210b includes a top portion 2100b configured for receiving the rotating component 40b, and a bottom portion 2102b configured for receiving an image sensor 70b positioned on a circuit board 60b. A ledge 214b is formed between the top portion 2100b and the bottom portion 2102b and is configured for supporting the rotating component 40. The base 20b has four sidewalls (not labeled). Each sidewall defines a handle cutout 212b. Each handle cutouts 212b communicates with the top portion 2100b and has three walls 2122b, 2123b, 2124b. The walls 2122b, 2124b correspond to each other. In the embodiment of FIGS. 5 through 7, the base 20b includes four cylindrical-shaped first positioning members 22b positioned on the corners of the body 21b along the axis 200. Each handle cutout 212b is located between two adjacent first positioning members 22b. In one embodiment, the first positioning member 22b may be integrally formed with the hollow body 21b. In another embodiment, the first positioning member 22b may be fixed to the hollow body 21b, for example, using an adhesive or by friction, such as by press-fitting.

The lens barrel 30b is configured for receiving at least one lens 32b and includes a main body 302b and a square-shaped cap 304b positioned on an end of the main body 302b. An outer screw thread 3021b is formed on the main body 302b. An aperture 3041b is defined at a central portion of the cap 304b and at least one second positioning member 3042b corresponding to the first positioning member 22b is defined in the cap 304b. The aperture 3041b is configured for allowing light to enter the lens module 10b. In the embodiment of FIGS. 5 through 7, the second positioning member 3042b may be a positioning hole.

The rotating component 40b includes a first annular rotating barrel 41b, a second annular rotating barrel 43b coaxially connected to the bottom of the first rotating barrel 41b, and a handle 42b protruding outwardly the first rotating barrel 41b. An inner screw thread 410b is formed on the inner wall of the first rotating barrel 41b and is configured for engaging with the outer screw thread 3021b. The outer diameter of the first rotating barrel 41b is larger than the inner diameter of the ledge 214b and is equal to or slightly smaller than the diameter of the top portion 2100b. The outer diameter of the second rotating barrel 43b is equal to or slightly smaller than the inner diameter of the ledge 214b. The inner diameter of the second rotating barrel 43b is larger than or equal to that of the main body 302b, such that lights passing through the lens 32b can pass through the second rotating barrel 43b. The thickness of the first rotating barrel 41b in the axial direction is equal to or slightly larger than a height of the top portion 2100b.

The positioning component 50b may be a square sheet and defines a center hole 501b and at least one through hole 502b. The diameter of the through hole 501b is slightly larger than the outer diameter of the main body 302b. The through hole 502b corresponds to the first positioning member 22b and the second positioning member 3042b.

The main body 302b of the lens barrel 30b attached to the main body 302b is received in the center hole 501b. The outer screw thread 3021b threadedly engages with the inner screw thread 410b. The first rotating barrel 41b is received in the top portion 2100b and contacts the ledge 214b. The second rotating barrel 43b is received in the annular ledge 214b. The handle 42b is received in one of the handle cutouts 212b and can move freely in the handle cutout 212. The first positioning 22b is received in the through hole 502b and the positioning hole 3042b, thereby restricting the lens barrel 30b to move along the axis 200. The positioning component 50b is fixed to the base 20b and restricts the rotating barrel 41b in the top portion 2100b and prevents the rotating component 40b from moving along the axis 200.

The handle 42b drives the rotating barrel 41b to rotate in the top portion 2100b when the handle 42b is moved along the handle cutout 212b. The inner screw thread 410b engages with the outer screw thread 3021b to drive the lens barrel 30b to move along the axis 200. The first positioning member 22b prevents the lens barrel 30b from rotating. Accurate focusing of the lens module 10b may be achieved according to a pitch of the inner screw thread 410b and the outer screw thread 3021b.

It may be appreciated that the first positioning member 22b may be a positioning hole defined in the top surface of the body 21b, and the second positioning member may be cylindrical shaped and extends from the cap 304b along the axis 200.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A lens module comprising:
   a base comprising:
      at least one first positioning member; and
      a hollow body, wherein a receiving hole is defined in the hollow body; a ledge is formed in the receiving hole;
   a rotating component comprising an annular first rotating barrel, wherein an inner screw thread is formed on the inner wall of the first rotating barrel; the first rotating barrel is received in the receiving hole and contacts the ledge;
   a positioning component being positioned on the base and configured for restricting the rotating barrel to be in continuous contact with the ledge, wherein a center hole is defined in a center portion of the positioning component; and
   a lens barrel having an axis, the lens barrel comprising:
      a main body passing through the center hole of the positioning component, wherein an outer screw thread is formed on the main body and engages with the inner screw thread; and
      at least one second positioning member engaging with the at least one first positioning member and configured for guiding the lens barrel to move along the axis.

2. The lens module of claim 1, wherein the at least one first positioning member is cylindrical shaped and positioned on a top surface of the body, and extends along the axis; the at least one second positioning member is a positioning hole defined in the lens barrel and configured to slide along the first positioning member.

3. The lens module of claim 1, wherein the at least one first positioning member is a positioning hole defined in the top surface of the body; the at least one second positioning member is cylindrical shaped and positioned on the lens barrel and extends along the axis; the at least one second positioning member is received in the at least one positioning hole.

4. The lens module of claim 1, wherein the ledge divides the receiving hole into a top portion and a bottom portion configured for receiving an image sensor; the first rotating barrel is received in the top portion.

5. The lens module of claim 1, wherein a handle cutout is defined on a top portion of the body; a handle protrudes outwardly from the first rotating barrel and is moveably received in the handle cutout.

6. The lens module of claim 1, wherein the lens barrel comprises a cap positioned on an end of the main body; an aperture is defined at a central portion of the cap; the at least one second positioning member is positioned on the cap.

7. The lens module of claim 4, wherein an outer diameter of the first rotating barrel is larger than an inner diameter of the ledge and is equal to or smaller than the diameter of the top portion, a thickness of the first rotating barrel along the axis is equal to or larger than a height of the top portion.

8. The lens module of claim 1, wherein the rotating component further comprises a second rotating barrel coaxially connected to the bottom of the first rotating barrel; the second rotating barrel is received in the ledge.

9. The lens module of claim 8, wherein an outer diameter of the second rotating barrel is equal to or smaller than an inner diameter of the ledge.

10. The lens module of claim 9, wherein the inner diameter of the second rotating barrel is larger than or equal to an inner diameter of the main body.

11. A lens module comprising:
a base comprising:
at least one first positioning member; and
a hollow body, wherein a receiving hole is defined in a center portion of the hollow body; an opening is defined in a top portion of the hollow body, a ledge is formed in the receiving hole;
a rotating component comprising an annular rotating barrel, wherein an inner screw thread is formed on the inner wall of the annular rotating barrel; the annular rotating barrel is received in the receiving hole and contacts the ledge; a handle protrudes outwardly from the rotating barrel and moveably received in the opening; and
a lens barrel having an axis, the lens barrel comprising:
a main body forming an outer screw thread that engages with the inner screw thread; and
at least one second positioning member engaging with the at least one first positioning member and configured for guiding the lens barrel to move along the axis.

12. The lens module of claim 11, wherein the opening is rectangular shaped and has a bottom wall, a top wall parallel to the bottom wall, and two sidewalls; the bottom wall and the top wall are perpendicular to the axis.

13. The lens module of claim 12, wherein the handle has a thickness along the axis equal to a distance between the bottom wall and the top wall of the opening.

14. The lens module of claim 11, wherein the at least one first positioning member is cylindrical shaped and positioned on a top surface of the body, and extends along the axis; the at least one second positioning member is a positioning hole defined in the lens barrel and configured to slide along the first positioning member.

15. The lens module of claim 11, wherein the at least one first positioning member is a positioning hole defined in the top surface of the body; the at least one second positioning member is cylindrical shaped and positioned on the lens barrel and extends along the axis, and is received in the at least one positioning hole.

16. The lens module of claim 11, wherein the annular ledge divides the receiving hole into a top portion and a bottom portion configured for receiving an image sensor; the first rotating barrel is received in the top portion.

17. The lens module of claim 11, wherein the lens barrel comprises a cap positioned on an end of the main body; an aperture is defined at a central portion of the cap; the at least one second member is positioned on the cap.

18. The lens module of claim 16, wherein an outer diameter of the rotating barrel is larger than an inner diameter of the ledge and is equal to or smaller than the diameter of the top portion.

* * * * *